United States Patent [19]
Yanagida

[11] Patent Number: 5,088,864
[45] Date of Patent: Feb. 18, 1992

[54] AUTOMATIC ENGRAVING SYSTEM

[75] Inventor: Jun Yanagida, Tokyo, Japan

[73] Assignees: Gojigen Kikaku Co.; Petio Co., Ltd., both of Japan

[21] Appl. No.: 525,534

[22] Filed: May 18, 1990

[30] Foreign Application Priority Data

May 19, 1989 [JP] Japan ................... 1-124189

[51] Int. Cl.⁵ .................. B23C 3/13; G05B 19/00
[52] U.S. Cl. ......................... 409/96; 358/299; 364/474.29
[58] Field of Search ............ 409/85, 89, 90, 96; 364/474.29, 474.05, 474.26; 358/299

[56] References Cited

U.S. PATENT DOCUMENTS

| | | | |
|---|---|---|---|
| 3,085,923 | 4/1963 | Agnew | 409/96 X |
| 3,213,757 | 10/1965 | Cardwell, Jr. | 409/96 X |
| 3,246,570 | 4/1966 | Nogradi et al. | 409/96 |
| 4,052,739 | 10/1977 | Wada et al. | 358/299 |
| 4,385,360 | 5/1983 | Yamada et al. | 358/299 |
| 4,575,805 | 3/1986 | Moermann et al. | 364/474.05 |
| 4,972,323 | 11/1990 | Cauwet | 364/474.29 |

*Primary Examiner*—William Briggs
*Attorney, Agent, or Firm*—Andrus, Sceales, Starke & Sawall

[57] ABSTRACT

An automatic engraving system for automatically engraving the lateral contour of a person's face on one surface of a medal includes two industrial television cameras for three-dimensionally measuring the lateral contour of the person's face by using light beam or laser light beam, a computer for determining the lateral contour of the person's face by processing the dimensional data derived from measurements and at least one three-dimensional cutting machine for engraving on the medal the lateral contour of the person's face based on the processed date derived from the computer.

5 Claims, 5 Drawing Sheets

AUTOMATIC ENGRAVING SYSTEM

BACKGROUND OF THE INVENTION

1. Technical Field of the Invention

The present invention relates generally to an automatic engraving system. More particularly, the present invention relates to a system for automatically engraving the contour of a person's face as seen in the lateral direction on one surface of a medal as a raw material within a short period of time.

2. Description of the Background Art

Hitherto, when medals each having a certain image indicative of a monument or a famous great man on one surface thereof are produced, a master model is first manually fabricated one by one by a skilled craftsman and then a number of medals are produced on a mass production line using a press die derived from the master model.

The above-described conventional method is preferably employable for producing a number of medals each having a same design on a mass production line. However, the conventional method fails to effectively produce a medal one by one of which one surface is engraved with a specific design.

As is well known, medal vending machines are installed on an exhibition ground or the like place where many persons get together. Each of medals received from the vending machine by putting a certain value of coins in a coin collector is previously embossed with a specific image indicative of a monument or a famous great man. In addition, a stamping machine is installed to stamp a date, a name, a location or the like on a blank space of the coin, as required. However, items to be stamped on the coil are limited only to a vendee s name, a date, characters or the like item but a specific design required by the vendee can not be engraved on the coin any longer.

SUMMARY OF THE INVENTION

The present invention has been made with the foregoing background in mind and its object resides in providing a system for automatically engraving medals each having the contour of a person's face as seen in the lateral direction in a certain location at a certain time on one surface thereof within a short period of time by his request.

To accomplish the above object, the present invention provides a system for automatically engraving medals each having the contour of a person's face as seen in the lateral direction on one surface thereof, wherein the system includes as essential components three-dimensional contour measuring means for three-dimensionally measuring the lateral contour of the person's face by using light beam or laser light beam, a computer for processing the dimensional data derived from the three-dimensional contour measuring means to determine the lateral contour of the person's face, and at least one three-dimensional cutting machine for engraving the lateral contour of the person's face on one surface of a medal as a raw material based on the processed data derived from the computor.

In addition, the system further includes monitoring means to assure that the center line of a person sitting on a chair is located in correct alignment with the center line of the monitoring means.

The three-dimensional contour measuring means comprises two industrial television cameras each disposed at a position offset from the lateral contour of the person's face by a predetermined angle and two charge coupled devices electrically coupled to the two industrial television cameras, each of the charge coupled devices including a monitor screen on which the lateral contour of the person's face is displayed and a number of lattice points being arranged on the monitor screen.

The lateral contour of the person's face is determined by sequentially measuring a width, a height and a thickness of the lateral contour of the person's face at a certain actual point on the latter and sequentially processing the dimensional data derived from the measurements in the computor.

Then, each width, each height and each thickness of the lateral contour of the person's face at each actual face are determined based on an angle defined by the actual point on the lateral contour of the person's face relative to the corresponding lattice point on the screen of one charge coupled device electrically coupled to one of the industrial television camera and an angle defined by the actual point on the lateral contour of the person's face relative to the corresponding lattice point on the screen of other charge coupled device electrically coupled to other industrial television camera.

Other objects, features and advantages of the present invention will become more readily apparent from reading of the following description which has been made with reference to the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate a preferred embodiment thereof.

Figure 1:
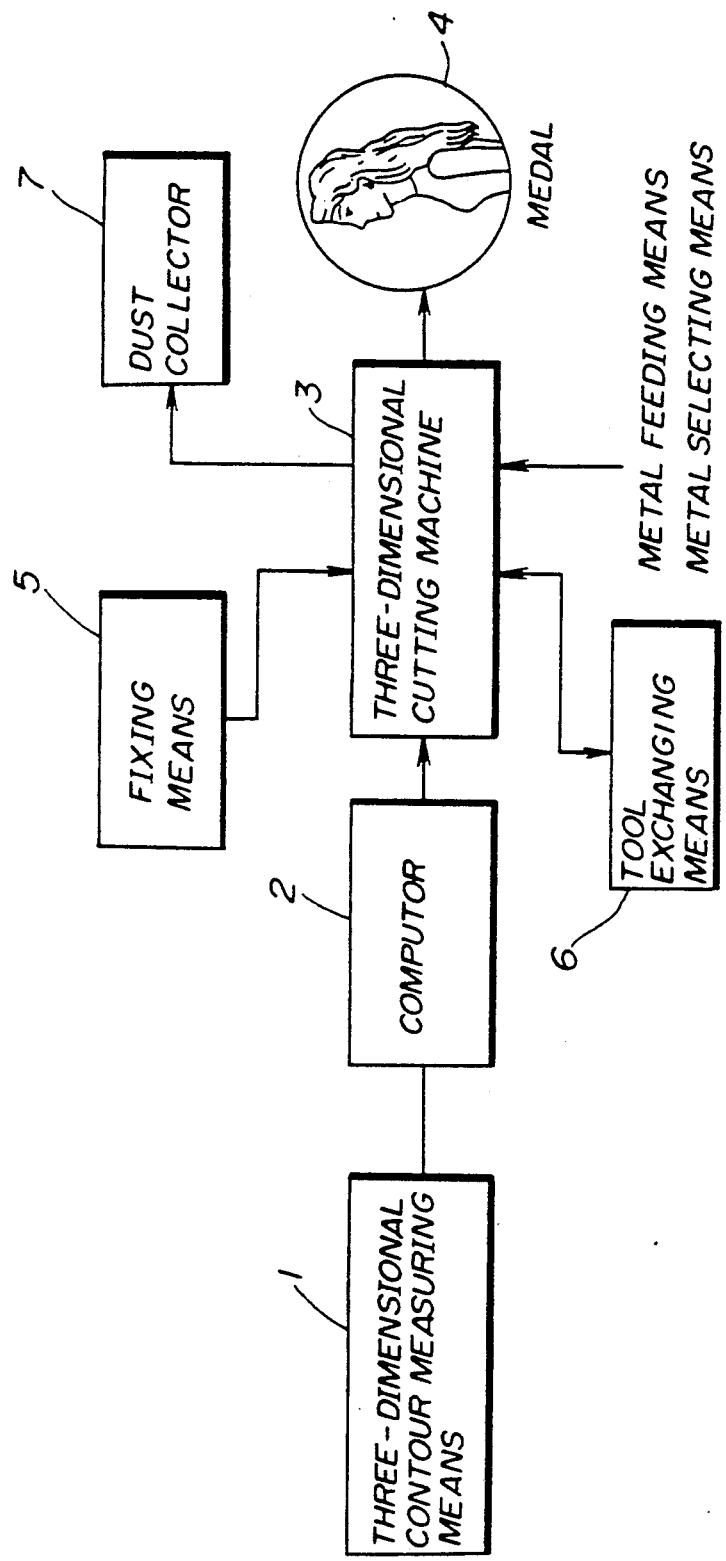
FIG. 1 is a block diagram which schematically illustrates by way of example structure of an automatic engraving system in accordance with an embodiment of the present invention.

FIG. 1 is a block diagram which schematically illustrates by way of example structure of an automatic engraving system in accordance with the embodiment of the present invention. In the drawing, reference numeral 1 designates adequate three-dimensional contour measuring means for three-dimensionally measuring the contour of an upper half of a sitting lady as seen in the lateral direction by using light beam or laser light beam, reference numeral 2 designates a computor in the form of a central processing unit (hereinafter referred to as CPU) for calculating a number of dimensional data derived from measurements with the contour measuring means 1 in respect of a width, a length and a thickness of the measured contour of the lady by way of a series of storing, calculating processing and correcting operations, and reference numeral 3 designates a three-dimensional cutting machine for engraving the contour of the lady as seen in the lateral direction on one surface of a medal as a raw material in accordance with the data processed by the CPU 2.

Any conventional machine tool is employable for the three-dimensional cutting machine 3, provided that it is proven that the machine tool can cut the medal 4 by way of several steps. Specifically, the machine 3 is equipped with fixing means 5 in the form of a vice for firmly holding the medal 4, tool exchanging means 6 for sequentially exchanging a plurality of cutting tools, e.g., drill, cutter, end mill or the like tool in accordance with an order preset for engraving operations to be performed for the medal 4 and a dust collector 7 for centrally collecting cut chips. In addition, as required, the machine 3 may be provided with medal feeding means in which several kinds of medals different from each other in color, size and other factors are previously stored and one medal selected from among the stored metals by request is fed to a cutting location on a table of the machine 3.

Figure 2:
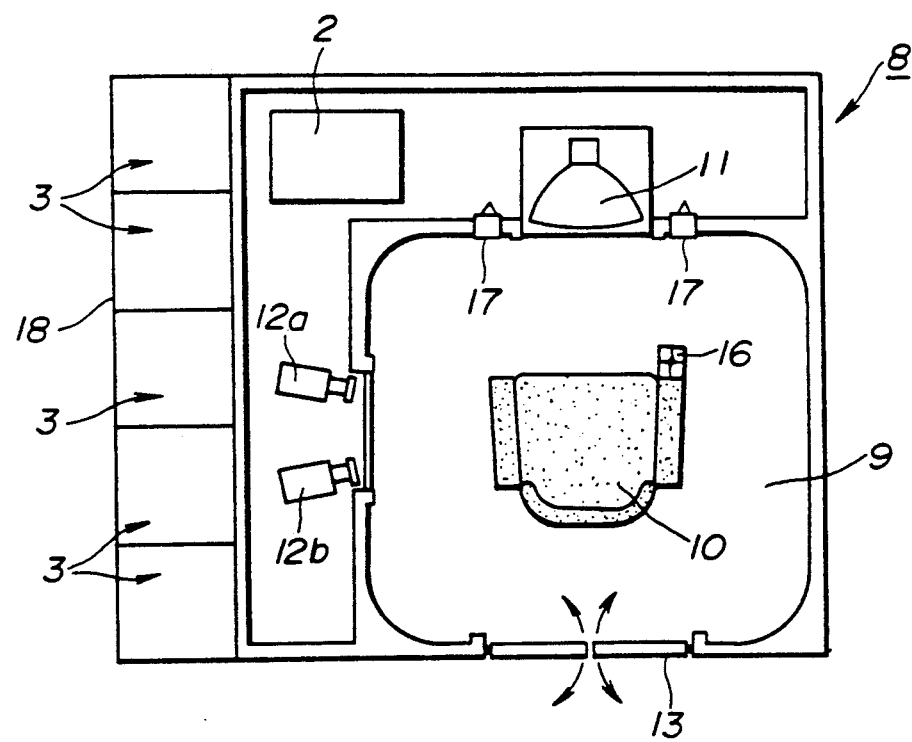
FIG. 2 is a schematic plan view illustrating arrangement of the system in FIG. 1.
Figure 3:
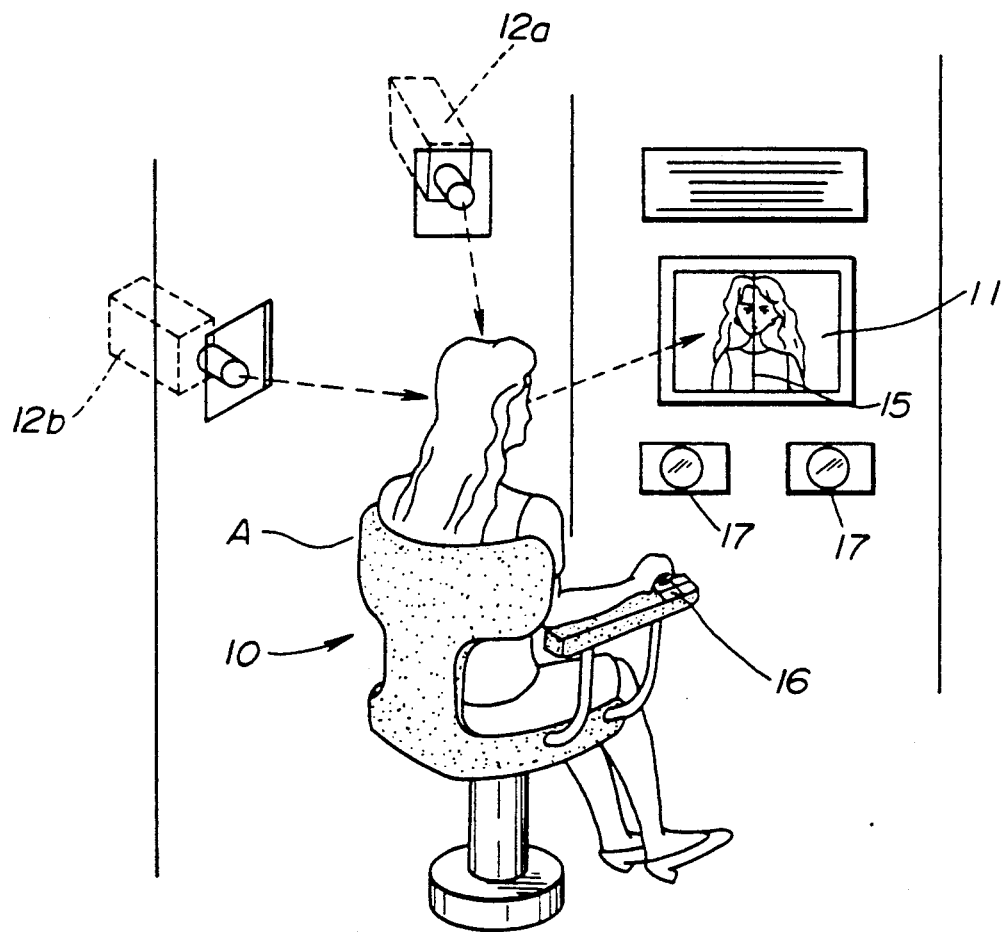
FIG. 3 is a perspective view of the system in FIG. 1.

FIGS. 2 and 3 are a view illustrating by way of example concrete structure of the automatic engraving system of the present invention, respectively. In the drawings, reference numeral 8 designates a housing for the automatic engraving system for which a plurality of three-dimensional cutting machines 3 (five machines in the shown case) are installed. The housing 8 is assembled and firmly installed on a required site, e.g., an exhibition ground, a recreation ground or the like place. Alternatively, the housing 8 may be constructed in a portable structure so that it can be placed on an automotive vehicle to freely change its operation site.

Reference numeral 9 designates an operation booth in the housing 8. A chair 10 is arranged at the central part of the booth 9 so that a lady A sits on the chair 10 as a model for engraving operations.

Reference numeral 11 designates a monitor section which is located in front of the lady A sitting on the chair 10. An image of the lady A is displayed on a screen of the monitor section 11. Reference numerals 12a and 12b designates an industrial television camera, respectively. Each of the television cameras 12a and 12b is arranged at a position offset from the sitting lady A by a predetermined angle. Reference numeral 13 designates an entrance through which she has entered the booth 9.

Figure 4:
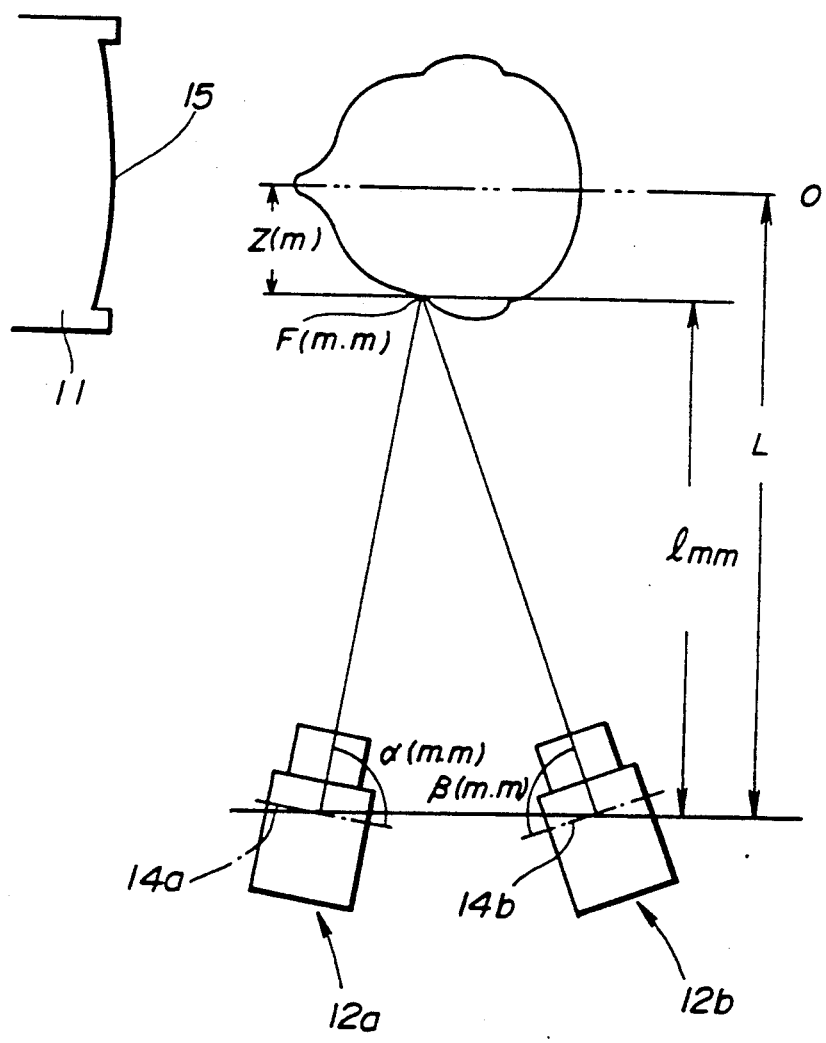
FIG. 4 is a schematic plan view illustrating the system of the present invention.

Next, detailed description will be made below with reference to FIG. 4 as to an example of operations to be performed by the three-dimensional contour measuring means 1.

In the shown example, two industrial television cameras 12a and 12b and two charge coupled devices (hereinafter referred to as CCD) 14a and 14b electrically coupled to the television cameras 12a and 12b are used for calculating widths X, heights Y and thicknesses Z at a number of positions on the lateral contour of the lady A by using light beam or laser light beam. A center line 15 is previously placed on the screen of the monitor 11. The lady A should correctly sit on the chair 10 to assume her own position where a center line of her face exactly matches with the center line 15 by watching her image on the monitor 11. Namely, the center line 0 of her face should be located in correct alignment with the center line 15 on the screen of the monitor 11. To this end, the chair 10 is turned to the left or right and/or raised up or lowered to adjust its position. Alternatively, the monitor 11 may be turned to the left or right and/or raised up or lowered by actuating a suitable mechanism (not shown).

While the foregoing correct position is maintained, she puts a predetermined value of coins in a coil receiver (not shown) and then shifts a switch 16 to ON. In response to shifting of the switch 16 to ON, the television cameras 12a and 12b are activated.

At this time, the contour of the lady A as seen in the lateral direction is displayed on a screen of each of the CCDs 14a and 14b. Then, an image on the screen of the CCD (see FIG. 5) is stored in the CPU 2. At the same time, the CPU 2 determines by calculation a series of angles $\alpha_{11}$ to $\alpha_{nn}$ defined by respective lattice points P ($P_{11}$, $P_{12}$, - - -, $P_{21}$, $P_{22}$, - - -, $P_{nn}$) on the one CCD 14a relative to respective actual points F ($F_{11}$, $F_{12}$, - - -, $F_{21}$, $F_{22}$, - - -, $F_{nn}$) on the lateral contour and a series of angles $\beta_{11}$ to $\beta_{nn}$ defined by respective lattice points Q ($Q_{11}$, $Q_{12}$, - - -, $Q_{21}$, $Q_{22}$, - - -, $Q_{nn}$) on the other CCD 14b relative to the respective actual points F ($F_{11}$, $F_{12}$, - - -, $F_{21}$, $F_{22}$, - - -, $F_{nn}$) on the lateral contour of the lady A.

Figure 5:
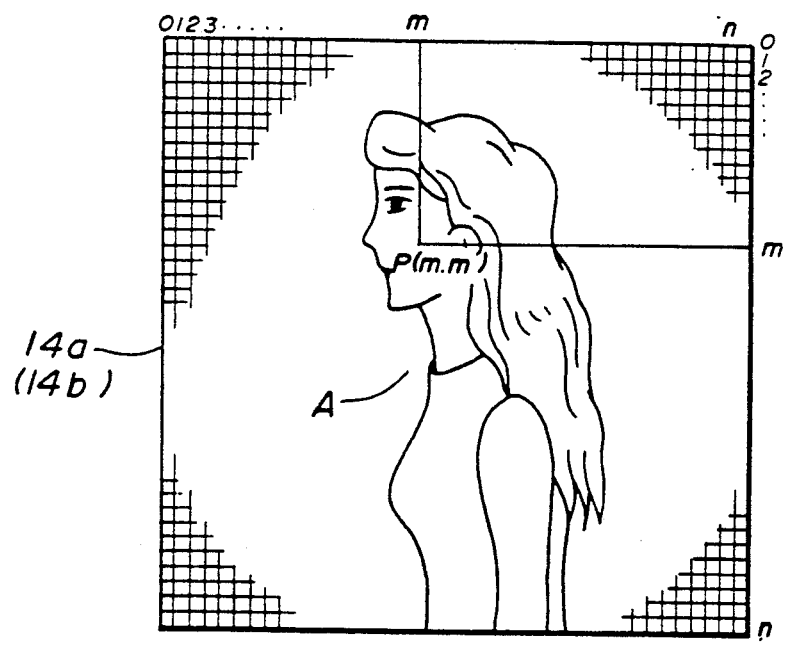
FIG. 5 is a view illustrating the contour of a lady's face as seen in the lateral direction which appears on the screen of a monitor television for the system of the present invention.

Referring to FIG. 5, for example, the CPU 2 determines by calculation an angle $\alpha_{mm}$ defined by an actual point $F_{mm}$ on the lateral contour relative to a lattice point $P_{mm}$ on the CCD 14a corresponding to the actual point $F_{mm}$ and an angle $\beta_{mm}$ defined by the actual point $F_{mm}$ on the lateral contour relative to a lattice point $Q_{mm}$ on the CCD 14b by using light beam or laser light. After determination of the angles $\alpha_{mm}$ and $\beta_{mm}$, the CPU 2 calculates a distance $l_{mm}$ between the actual point $F_{mm}$ on the lateral contour and each television camera. Since a distance L between the center line O of the lateral contour and each TV camera has been previously determined, a thickness $Z_{mm}$ of the lateral contour of the lady A can be calculated by subtracting the distance $l_{mm}$ from the distance L.

In this manner, a series of thicknesses Z at respective points on the lateral contour of the lady A are calculated by sequentially performing calculating operations for all the points $P_{11}$ to $P_{nn}$ and $Q_{11}$ to $Q_{nn}$ on the CCDs 14a and 14b corresponding to the points $F_{11}$ to $F_{nn}$ by using light beam or laser light beam. In addition, the CPU 2 calculates a series of widths X and a series of heights Y at respective points on the lateral contour of the lady A in the same manner as described above, whereby the CPU can determines a whole three-dimensional configuration of the lady A.

Thereafter, the CPU 2 corrects the dimensional results derived from the aforementioned measurements and calculations corrected in accordance with preset arithmetic formulas. Now, each engraving machines 3 is ready to perform engraving operations on one surface of the medal 4 based on the thus corrected dimensional data. The foregoing correction is normally carried out by dividing the respective widths X, the respective heights Y and the respective thicknesses A with a constant rate. However, the present invention should not limited only to this. Alternatively, correction may be carried out using different rates. It is preferable that a correction rate for the thicknesses Z is set smaller than those for the widths X and the heights Y. For example, the former is set to 1/100, while the latter are set to 1/10, respectively. This is because a medal to be engraved is required to have an excessively heavy thickness, if an engraving operation is to be performed based on the dimensional data on the lateral contour of the lady A which have been derived from the CPU 2 without correction.

To inform her of how far the medal 4 has been engraved at present, a region on the medal 4 where the engraving operation has been completed is displayed on the screen of the monitor 11 with a different color. Alternatively, the present operational step within the range of a single engraving operation may vocally be informed to her via a speaker.

In a case where the automatic engraving system is installed on an exhibition ground or the like place on the commercial basis, it is required that the system is operated at a high efficiency for a possibly long period of time per each day with minimized time loss. To meet the requirement, it is recommendable that the lateral contour displayed on the screen of each CCD 14 is first stored in the CPU 2 and an engraving operation is then performed based on the stored data without necessity for allowing the lady A to continuously stay on the chair 10 till completion of the engraving operation. During the engraving operation, the lady A leaves the booth 9 and another person sits on the chair 10 in place of the lady A. In this case, a receiving port where the engraved medal 4 should be received by the lady A is located outside of the housing 8.

In the shown case where a plurality of automatic engraving machines 3 are installed adjacent to the booth 8, it is preferable that the machines 3 are successively operated so as to allow a plurality of medals to be successively engraved for many persons without long waiting time.

As desired, a wall 18 located outside of the engraving machines 3 may be made transparent in order that other persons can visually recognize from the outside how far each medal is being engraved.

The present invention has been described above as to the case where a medal is engraved based on dimensional data on the lateral contour of one person. Alternatively, the medal may be engraved based on dimensional data on the contour indicative of an upper half of one person or the whole body of one person as seen from the front side. Further, the medal may be engraved based on dimensional data on the contour indicative of plural persons, e.g. a combination of parent and child or children, a couple of young man and woman or a single family.

Additionally, the three-dimensional contour measuring means 1 should not be limited only to a combination of the industrial television cameras 14A and 14b and the CCDs 12a and 12b as described above. The following methods may be employed for the three-dimensional contour measuring means 1 which is arranged for the system of the present invention.

One of them is a so-called light beam or laser light beam cutting method. According to this method, a person's face is scanned by a light beam or laser light beam in the form of a light film which is produced by a parallel light beam enlarging lens system (beam expander) and a composite system comprising a plurality of column-shaped lenses. With this method, an intersection defined by the light film and the outline of the person's face is created in the form of a bright line which represents the contour of a plane derived from a cutting operation for the person, by using light beam or laser light beam serving as a knife. Thus, a three-dimensional configuration of the person's face can be measured by displacing the light film relative to the person's face. Other method is a Moire equitopographic method. According to this method, a lattice having a plurality of slits formed thereon at a constant distance of pitch is arranged in a spaced relationship in front of a person's face and light beam or laser light beam is projected toward the person's face through the slits to form a plurality of light fringes. When the light fringes are observed through the same slits in a different direction from that extending from a light source, intersections defined by the light fringes and the viewing lines can visually be recognized such that a distance between the lattice surface and the person's face, a lattice pitch and a viewing angle satisfy given conditions. A number of intersections continuously appear as the lattice is slidably displaced in the surface between the lattice and the person's face, whereby equialtitude lines are drawn to build an image indicative of the person's face. Another method is such that the shadow of a mesh-shaped lattice having a number of lines extending at a right angle is projected on a person's face and the resultant mesh-shaped image is processed by a computor to measure a contour representative of the person's face. A holographic interference method wherein deformation and strain are measured can be noted as another available method.

As will be readily apparent from the above description, according to the present invention, a system for automatically engraving medals includes as essential components three-dimensional contour measuring means for three-dimensionally measuring the contour of a person as seen in the lateral direction without contact with the person's face by using light beam or laser light beam, a computor for processing dimensional data derived from measurements with the three-dimensional contour measuring means and at least one three-dimensional cutting machine for engraving one surface of a medal based on the thus processed data to reproduce on the medal an image representative of the person's face. The system of the present invention assures that a medal having an image dimensionally equal to the person's face can be engraved in the entirely same manner as the conventional image derived from a photographic method. Here, it should be emphasized that just a single unique medal having the person's face engraved thereon at a certain moment in a certain location can be produced in contrast with medals produced on a mass production line. This means that the thus derived medal is a very valuable memory token for the person at that moment. Thus, it is assured that the system of the present invention provides a new type of souvenir when the system is installed on an exhibition ground or the like place where many persons get together.

While the present invention has been described above with respect to a single preferred embodiment thereof, it should of course be understood that it should not be limited only to it but various changes or modifications may be made without departure from the scope of claim as defined by the appended claims.

What is claimed is:

1. A system for automatically engraving medals each having the contour of a person's face as seen in the lateral direction on one surface thereof, comprising:

three-dimensional contour measuring means for three-dimensionally measuring the lateral contour of the person's face by using light beam or laser light beam, a computer for processing the dimensional data derived from said three-dimensional contour measuring means to determine the lateral contour of the person's face, at least one three-dimensional cutting machine for engraving the lateral contour of the person's face on one surface of a metal as a raw material based on the data derived from said computer, and monitoring means for locating the center point of the person in correct alignment with the center line of said monitoring means.

2. The system as claimed in claim 1, wherein the lateral contour of the person's face is determined by sequentially measuring a width, a height and a thickness of the lateral contour of the person's face at a certain actual point on the latter and sequentially processing the data derived from said measurement in said computor by using a light beam or laser light beam.

3. A system for automatically engraving medals each having the contour of a person's face as seen in the lateral direction on one surface thereof, comprising:

three-dimensional contour measuring means for three-dimensionally measuring the lateral contour of the person's face by using light beam or laser light beam, a computer for processing the dimensional data derived from said three-dimensional contour measuring means to determine the lateral contour of the person's face, at least one three-dimensional cutting machine for engraving the lateral contour of the person's face on one surface of a metal as a raw material based on the data derived from said computer, and wherein said three-dimensional contour measuring means comprises two industrial television cameras each disposed at a position offset from the lateral contour of the person's face by a predetermined angle and two charge coupled devices electrically coupled to said two industrial television cameras, each of said two charge coupled devices including a monitor screen on which the lateral contour of the person's face is displayed and a number of lattice points being arranged on said monitor screen.

4. The system as claimed in claim 3, wherein each width, each height and each thickness of the lateral contour of the person's face at each actual point are determined based on an angle defined by said actual point on the lateral contour of the person's face relative to the corresponding lattice point on the screen of one charge coupled device electrically coupled to one of the industrial television cameras and an angle defined by an actual point on said lateral contour of the person's face relative to the corresponding lattice point on the screen of other charge coupled device electrically coupled to other industrial television camera, respectively.

5. The system as claimed in claim 2, wherein said industrial television cameras are vertically displaced relative to the chair for the person and vice versa to sequentially determine said width, said height and said thickness at said actual point on the lateral contour of the person's face at all the lattice points on the screen of each of the charge coupled devices.

* * * * *